United States Patent
Herding et al.

(10) Patent No.: US 12,383,856 B2
(45) Date of Patent: Aug. 12, 2025

(54) FILTER DEVICE AND METHOD OF CLEANING-OFF A FILTER ELEMENT OF A FILTER DEVICE

(71) Applicant: Herding GmbH Filtertechnik, Amberg (DE)

(72) Inventors: Walter Herding, Hahnbach (DE); Urs Herding, Amberg (DE); Egid Koller, Theuern (DE); Dino Bethke, Königstein (DE); Stefan Hajek, Amberg (DE); Christoph Weih, Hirschau (DE)

(73) Assignee: Herding GmbH Filtertechnik (DE)

( * ) Notice: Subject to any disclaimer, the term of this patent is extended or adjusted under 35 U.S.C. 154(b) by 103 days.

(21) Appl. No.: 17/769,063

(22) PCT Filed: Oct. 13, 2020

(86) PCT No.: PCT/EP2020/078767
§ 371 (c)(1),
(2) Date: May 26, 2022

(87) PCT Pub. No.: WO2021/074143
PCT Pub. Date: Apr. 22, 2021

(65) Prior Publication Data
US 2024/0100465 A1   Mar. 28, 2024

(30) Foreign Application Priority Data
Oct. 15, 2019   (DE) ...................... 10 2019 127 751.5

(51) Int. Cl.
*B01D 46/00*   (2022.01)
*B01D 46/24*   (2006.01)
(Continued)

(52) U.S. Cl.
CPC ......... *B01D 46/71* (2022.01); *B01D 46/0006* (2013.01); *B01D 46/2411* (2013.01);
(Continued)

(58) Field of Classification Search
CPC ................ B01D 46/71; B01D 46/0006; B01D 46/2411; B01D 46/44; B01D 46/62;
(Continued)

(56) References Cited

U.S. PATENT DOCUMENTS 4,161,389 A * 7/1979 Staffin ................ B01D 46/2407
55/341.6
4,746,339 A * 5/1988 Millard .............. B01D 46/0001
425/117

(Continued)

FOREIGN PATENT DOCUMENTS

| DE | 372967 C | 4/1923 | |
| DE | 903890 C | 2/1954 | |
| DE | 202017104480 U1 * | 9/2017 | ............... A62C 4/00 |
| EP | 2091632 B1 | 8/2009 | |

OTHER PUBLICATIONS

Machine-generated English translation of DE 202017104480 U1, Published Sep. 21, 2017.*

(Continued)

*Primary Examiner* — Frank M Lawrence, Jr.
(74) *Attorney, Agent, or Firm* — Bachman & LaPointe, P.C.

(57) ABSTRACT

A filter device including at least one filter element adapted to filter a raw fluid and having a raw fluid side and a clean fluid side, the filter element having a clean fluid outlet arranged on the clean fluid side and extending in a first plane, at least one clean fluid collecting channel into which the clean fluid outlet opens; at least one compressed-air cleaning-off device adapted to generate a pressure pulse for cleaning-off foreign matter adhering to the filter element and to conduct the same through the clean fluid outlet to the filter element, wherein the compressed-air cleaning-off device is adapted to conduct the pressure pulse at least approximately along the first plane to the clean fluid outlet, wherein the compressed-air cleaning-off device comprises a com- (Continued)

pressed-air supply channel operationally coupled to a clean fluid collecting channel outlet and adapted to charge the clean fluid collecting channel with pressure pulses.

21 Claims, 9 Drawing Sheets

(51) Int. Cl.
 *B01D 46/44* (2006.01)
 *B01D 46/62* (2022.01)
 *B01D 46/71* (2022.01)
(52) U.S. Cl.
 CPC ............. *B01D 46/44* (2013.01); *B01D 46/62* (2022.01); *B01D 2267/60* (2013.01); *B01D 2267/70* (2013.01); *B01D 2275/205* (2013.01)
(58) Field of Classification Search
 CPC ............ B01D 46/2403; B01D 46/2407; B01D 2267/60; B01D 2267/70; B01D 2275/205
 USPC ..................... 95/280; 55/282, 283, 302, 303
 See application file for complete search history.

(56) References Cited

U.S. PATENT DOCUMENTS

| | | | | |
|---|---|---|---|---|
| 5,944,859 | A * | 8/1999 | Lippert | B01D 46/2407 55/DIG. 12 |
| 6,077,490 | A | 6/2000 | McIlroy et al. | |
| 6,658,988 | B1 * | 12/2003 | Dries | B01D 46/2407 55/284 |
| 8,157,878 | B2 * | 4/2012 | Weber | B01D 46/71 95/280 |
| 9,731,240 | B2 * | 8/2017 | Koyama | C10J 3/84 |
| 10,060,313 | B2 * | 8/2018 | Archetti | F01N 3/0233 |
| 10,625,194 | B1 * | 4/2020 | Mattox | B01D 46/2411 |
| 2002/0014156 | A1 | 2/2002 | Leibold et al. | |
| 2004/0211163 | A1 * | 10/2004 | Faulkner | B32B 27/36 55/486 |
| 2021/0162329 | A1 * | 6/2021 | Hori | B01D 46/06 |

OTHER PUBLICATIONS

EPC Communication to Rule 71(3) for counterpart application PCT/EP2020/078767 dated Feb. 6, 2025.
International Search Report for counterpart application PCT/EP2020/078767 dated Nov. 4, 2020.

* cited by examiner

FILTER DEVICE AND METHOD OF CLEANING-OFF A FILTER ELEMENT OF A FILTER DEVICE

BACKGROUND

The invention relates to a filter device and a method of cleaning-off a filter element in the filter device.

Such filter devices are used in industry in factories and plants of a large variety of industrial branches, for example in the automotive industry, the chemical industry, the food industry or in the production of building materials.

The filter device according to the invention comprises at least one filter element designed for filtering a raw fluid and having a raw fluid side and a clean fluid side, and a compressed-air cleaning-off device. The compressed-air cleaning-off device is designed to generate compressed air pulses for cleaning off or removing foreign matter adhering to the filter element.

The filter element has at least one clean fluid outlet arranged on the clean fluid side, through which filtered clean fluid is discharged from the filter element.

In conventional filter devices, a plurality of compressed-air injectors are associated with the filter element, each of which is arranged adjacent to a clean fluid outlet in such a way that it injects compressed air directly into the filter element counter to the direction of flow of the clean fluid and without deflection through the clean fluid outlet.

A filter device comprising a cleaning-off device is known from EP 2 091 632 B1. The filter device comprises tubular filter elements made of metal, glass or ceramic, which are arranged in a filter housing. The cleaning-off device operates with compressed air to remove impurities from the tubular filter elements. A compressed-air inlet of the cleaning-off device is arranged in the filter housing such that it terminates via a clean fluid collecting channel directly and without curvature in front of clean fluid outlets of the tubular filter elements.

SUMMARY

It is an object of the present invention to provide a filter device which enables less complex cleaning-off of the filter elements with at least equivalent cleaning-off results.

A filter device according to the invention comprises at least one filter element adapted to filter a raw fluid and having a raw fluid side and a clean fluid side, and at least one compressed-air cleaning-off device. The filter element has a clean fluid outlet arranged on the clean fluid side and extending in a first plane, through which clean fluid is conducted out of the filter element. The compressed-air cleaning-off device is adapted to generate a pressure pulse for cleaning off foreign matter or contaminants adhering to the filter element and to conduct the same through the clean fluid outlet to the filter element. The compressed-air cleaning-off device is further adapted to conduct the pressure pulse at least approximately along the first plane to the clean fluid outlet.

The clean fluid results from raw fluid loaded with particulate contaminants after having passed through the filter element. The particulate contaminants accumulate on the raw fluid side of the filter element. In order to remove these particulate contaminants from the filter element from time to time, the compressed-air cleaning-off device generates the pressure pulse which travels counter to the direction of flow of the clean fluid flowing away from the filter element towards the filter element and is coupled into the filter element through the clean fluid outlet. This principle is also referred to as the counterflow pulse or counterpressure pulse principle.

Conventionally, it has been customary to associate with each filter element or each clean fluid outlet opening of a filter element its own arrangement for injecting compressed air, which is arranged on the clean fluid side such that the filter element can be subjected to compressed air in order to separate material deposited on the filter element on the raw fluid side. Typically, such cleaning-off cycles in which compressed air is applied to the filter element have been carried out between normal filter operating cycles at certain time intervals. The compressed-air cleaning-off device according to the invention is designed such that pressure pulses generated by the com-pressed-air cleaning-off device move towards the filter element on the clean fluid side counter to the direction of flow of the clean fluid flowing away from the filter element. In particular, the flow of clean fluid away from the filter element can serve as a carrier fluid for the pressure pulses generated for cleaning off, which move counter to the direction of flow of the clean fluid. It is not necessary to interrupt a filter operating cycle that is currently in progress. The pressure pulses do not strike the clean fluid outlet opening of the filter element directly, but reach it from the side, so that the pressure pulses undergo a change in direction as they pass through the clean fluid outlet opening. This change in direction can be very pronounced, and in particular favorable results have been obtained when the pressure pulses are conducted to the filter element in such a way that they undergo a change in direction when entering through the clean fluid outlet opening, which change is in a range near 90° degrees, e.g. in a range between 60° and 120°, in particular between 70° and 110°, especially between 80° and 100°. A particularly preferred angle of deflection is 90°, or at any rate a range near 90°, such as between 85° and 95°. In this case, the pressure pulses propagate—at least in the vicinity of the clean fluid outlet opening—in a direction approximately parallel to a plane in which the clean fluid outlet opening extends. In this way, the effective cross-sectional area of the clean fluid outlet opening is very small in projection of the incoming pressure pulses. In extreme cases, this projection may even be zero, or at least approximately zero, when the pressure pulses approach the clean fluid outlet opening in a direction parallel to the plane in which the clean fluid outlet opening extends, and the pressure pulses are deflected at right angles as they pass through the clean fluid outlet opening. It has been found that even under such conditions, a very satisfactory cleaning-off result can be obtained for the filter element, without the need to expend significantly more energy to generate the pressure pulses. Apparently, it is possible to couple the pressure pulses into the filter element through the clean fluid outlet opening and to transmit them to the filter element from the clean fluid side in such a way that particulate foreign matter adhering to the filter element on the raw fluid side falls off the filter element.

A major advantage of the arrangement of the compressed-air cleaning-off device suggested according to the invention is that a single pressure pulse can approach a plurality of clean fluid outlet openings at nearly the same angle. In particular, these multiple clean fluid outlet openings can be arranged one after the other in the direction of travel of a pressure pulse. In this way, a single pressure pulse of the compressed-air cleaning-off device can be coupled in via a plurality of clean fluid outlet openings of a filter element arranged one after the other and/or a plurality of filter elements arranged one after the other and beside one another such that material deposited on the raw fluid side can be caused to fall off in all of the filter elements by the application of the same pressure pulse. In the case of filter elements with a pocket-like configuration in which there is a plurality of clean fluid discharge areas, each having its own clean fluid outlet opening, a single pressure pulse of the com-pressed-air cleaning-off device can be coupled in separately via each of the plurality of clean fluid outlet openings. It is even possible to arrange a plurality of such filter elements in series, so that the clean fluid outlet openings of all filter elements are sequentially reached by the pressure pulse. In addition, several such clean fluid outlet openings of a filter element and/or several filter elements each having its own clean fluid outlet opening, can be arranged beside each other, so that even more clean fluid outlet openings are reached by the pressure pulse. For example, four or five clean fluid outlet openings of a filter element and/or filter elements, each having its own clean fluid outlet opening, can be arranged one after the other and three clean fluid outlet openings of a filter element and/or filter elements, each having its own clean fluid outlet opening, can be arranged beside each other. In this way, extremely efficient cleaning-off of the filter element or several filter elements is possible by means of a pressure pulse acting on all clean fluid outlet openings in succession. In operation, it will generally be ensured that the pressure pulse acts on the clean fluid outlet openings at recurring intervals in order to perform a cleaning-off cycle of the associated filter element or the associated areas of the filter element in each case.

At least approximately along the first plane comprises an angle in a range of at most plus/minus 30°, in particular of at most plus/minus 20°, in particular of at most plus/minus 10° with respect to a smallest angle between the direction of the pressure pulse path and the first plane. Even with this orientation of the pressure pulse path, satisfactory cleaning-off of the filter elements is possible, although the pressure pulse must pass through the relatively narrow clean fluid outlet of the filter element and moreover is strongly deflected at this location in order to enter a clean fluid space of the filter element through the clean fluid outlet opening, namely between 60° and up to 90°. As an alternative to the above description, it may be said that the compressed-air pulse path in a region near the first plane extends at an angle of +/−30°, in particular +/−20°, in particular +/−10° to a normal vector of the first plane.

The at least one filter element can be designed as a rigid-body filter. In a rigid-body filter, the material and configuration are selected such that the filter element can be set up by itself, i.e. without the aid of an external support structure. This requires that the filter element has a filter body with a certain inherent rigidity. Rigid-body filters have a long service life and are characterized by efficient filtering performance. In particular, rigid-body filters are well suited to be cleaned off by means of the compressed-air cleaning-off device, since the rigid-body filter itself withstands the pressure pulse and transmits the same well.

The at least one filter element may comprise a filter body that is porous to permit flow therethrough, i.e. a through-flow-porous filter body made of a sintered material, wherein the sintered material comprises in particular a sintered plastic as main constituent, in particular sintered polyethylene particles or—for applications at higher operating temperatures—sintered polyphenylene sulfide particles as main constituent.

The filter element may have the configuration of a filter pocket or filter cartridge with sidewalls enclosing a clean fluid space and an open end face in which the clean fluid outlet is formed, and a closed end face opposite the clean fluid outlet. The clean fluid collects in the clean fluid space after passing through a wall of the filter element and is transported away from the filter element through the clean fluid outlet. The filter pocket or filter cartridge may have three, in particular four, sidewalls, and at least one foot end wall connecting the sidewalls to each other at a foot end opposite the clean fluid outlet.

The filter element, in particular in the configuration of a filter pocket or cartridge, may have in particular a box-like shape with two wide sidewalls and two narrow sidewalls extending from the clean fluid outlet to an opposite closed foot end. The foot end may be closed by a foot end wall. As an alternative, the sidewalls may be inclined to each other such that they contact each other at the end opposite the clean fluid outlet, thereby closing the end. The clean fluid outlet will typically be formed in a head end wall of the filter element. Such a filter element may have an angular cross-section, or a cross-section with rounded corners and/or side surfaces. The filter element may also assume a tubular shape, in which case the cross-section of the filter element may be oval or round.

The filter element may be arranged such that in particular the two wide sidewalls extend parallel to the direction of flow of the clean fluid downstream of the clean fluid outlet. In this regard, the wide sidewalls may be oriented such that they are parallel to the direction of the pressure pulse generated by the compressed-air cleaning-off device and traveling to the clean fluid outlet. With such an orientation, a plurality of clean fluid outlets may be formed at the head end of the filter element, following one another in the direction of the wide sidewalls, for example in the configuration of a plurality of openings each separated from the other by webs connecting the wide sidewalls. The pressure pulse will then enter the filter element through the individual clean fluid outlets or openings following one another in the direction of travel of the pressure pulse.

The filter element may be formed integrally.

The filter device furthermore may comprise at least one clean fluid collecting channel into which the clean fluid outlet of the filter element opens. In the case of a filter element having a plurality of clean fluid outlets and/or in the case of a plurality of filter elements arranged one after the other, a plurality of clean fluid outlets may be arranged one after the other in the direction of flow of the clean fluid flowing away from the filter element, all of these clean fluid outlets opening into the clean fluid collecting channel. The clean fluid collecting channel collects the clean fluid exiting the clean fluid outlet(s) and conveys the clean fluid further. The clean fluid collecting channel may extend in its longitudinal orientation at least approximately parallel, in particular parallel, to the first plane. The clean fluid collecting channel may preferably be a hollow body extending from a first closed end to a second open end.

The clean fluid collecting channel may have a cross-section that increases in the direction of flow of the clean fluid discharged from the clean fluid outlet, at least until no further clean fluid outlets open into the clean fluid collecting channel. In particular, the clean fluid collecting channel may increase steadily or uniformly from its upstream first end to its downstream second end. The term "steadily" is intended to express that the cross-section of the clean fluid collecting channel increases continuously downstream. Alternatively, some step-like increase in cross-section is conceivable, such as an increase in cross-section by a predetermined area upon or after passing another clean fluid outlet.

The clean fluid collecting channel can have a square, largely oval or largely round cavity cross-section. These are particularly flow-favorable shapes for discharging the clean fluid through the clean fluid collecting channel.

The filter device may have at least one, in particular two or more filter elements, with the filter elements, in the direction of flow of the clean fluid discharged from the filter element, being arranged one after the other, i.e. in series, downstream of the clean fluid outlet. In other words, the filter elements may be arranged sequentially from the first end to the second end of the clean fluid collecting channel. Each filter element has at least one clean fluid outlet of its own that opens into the clean fluid collecting channel. The filter elements may each also have multiple clean fluid outlets, as described hereinbefore. In this case, the clean fluid outlets are arranged one after the other in the direction of flow of the clean fluid. If desired, some of the filter elements may also be arranged such that their clean fluid outlets open into the clean fluid collecting channel opposite each other.

The compressed-air cleaning-off device may comprise a compressed-air supply channel configured to charge the clean fluid collecting channel with pressure pulses or to apply pressure pulses to the clean fluid collecting channel. The clean fluid collecting channel then transmits pressure pulses generated by the compressed-air cleaning-off device to the respective filter element(s) whose clean fluid outlet(s) open(s) into the clean fluid collecting channel. It has been shown that a clean fluid collecting channel with the configuration described herein is ideally suited as a transmission medium for counterflow pressure pulses during operation of the filter device. The compressed-air supply channel may couple to the clean fluid collecting channel at a location downstream of the last filter element, with respect to the direction of flow of the clean fluid flowing away from the filter element downstream of the clean fluid outlet.

The compressed-air supply channel may be operationally coupled to, or associated with, a clean fluid collecting channel outlet. At the clean fluid collecting channel outlet, the clean fluid exits the clean fluid collecting channel and reaches a downstream device, for example, the clean fluid may pass through the clean fluid collecting channel outlet into a clean fluid plenum, from which the clean fluid is discharged and optionally supplied to a downstream device for treating clean fluid.

An outlet end for pressure pulses of the compressed-air supply channel may be arranged opposite the clean fluid collecting channel outlet across an intermediate space. In other words, the outlet end of the compressed-air supply channel is approximately axially aligned with the direction of extension of the clean fluid collecting channel in its region adjacent to the clean fluid collecting channel outlet. Pressure pulses emanating from the compressed-air collecting channel thus pass directly into the clean fluid collecting channel.

It has been shown by experiments that the size of the space between the outlet end of the compressed-air supply channel and the clean fluid collecting channel outlet takes influence on the efficiency of filter element cleaning-off. In particular, it has been found that it is favorable if the space is selected so large that the pressure pulse noticeably increases its pressure pulse area in the course of its travel between the outlet end of the compressed-air supply channel and the clean fluid collecting channel outlet. In this way, it is possible to couple the pressure pulse into the clean fluid collecting channel with a certain amplification. On the other hand, the distance between the outlet end of the compressed-air supply channel and the clean fluid collecting channel outlet should remain small enough so that the pressure pulse area does not significantly exceed the cross-section of the clean fluid collecting channel outlet when the pressure pulse enters the clean fluid collecting channel. It is assumed that by suitably dimensioning the space, an effect similar to the principle of a trumpet or flute can be achieved. Fluid masses located in the space are excited by the pressure pulse. This excitation makes it possible for a comparatively weak pressure pulse leaving the compressed-air supply channel to be amplified in sufficiently strong manner on its way to the clean fluid collecting channel outlet so that a consistent cleaning-off effect as with conventional compressed-air cleaning-off devices can be achieved.

The compressed-air cleaning-off device may be configured to introduce the pressure pulse into the clean fluid collecting channel against or counter to a direction of flow of the clean fluid downstream of the clean fluid outlet.

The filter device may have at least two clean fluid collecting channels, each having at least one filter element disposed at the respective clean fluid collecting channel, wherein the at least two clean fluid collecting channels open into a common clean fluid plenum. Such a device can filter a large quantity of raw fluid. The clean fluid plenum may include a clean fluid plenum outlet that drains the clean fluid.

Each of the at least two clean fluid collecting channels may have associated therewith a corresponding compressed-air supply channel of the compressed-air cleaning-off device. The corresponding compressed-air supply channel may open into the clean fluid plenum opposite the corresponding clean fluid collecting channel outlet of the associated clean fluid collecting channel. Even if more than two clean fluid collecting channels are provided, each of the clean fluid collecting channels may have a compressed-air supply channel of its own associated therewith, which is aligned with respect to the respective clean fluid collecting channel outlet.

A control element, in particular a controllable valve or controllable flap which can be opened or closed, can be arranged at the compressed-air supply channel in order to control or regulate compressed air delivery and thus a pressure pulse into the corresponding clean fluid collecting channel.

The clean fluid collecting channel may have at least one filter element receptacle into which the filter element can be slidably inserted. The filter element receptacle may be designed such that the filter element can be slidably inserted from the clean fluid side, i.e. from the direction of the clean fluid collecting channel. As an alternative, the filter element receptacle can also be designed such that the filter element is slidably inserted from the raw fluid side, i.e. in the view from the clean fluid collecting channel is applied to the clean fluid collecting channel from the outside.

The filter element receptacle may have an opening formed in the clean fluid collecting channel, which is designed to cooperate with a filter element head of the filter element, so that the filter element head can be received in the opening and anchored there. When the filter element is installed from the clean fluid side, the filter body of the filter element extends through the opening into the raw fluid space. When the filter element is installed from the raw fluid side, the filter element head sits on the opening so that the clean fluid outlet of the filter element disposed in the filter element head cooperates with the opening to allow the clean fluid to escape through the opening into the clean fluid collecting channel.

The opening may include a frame extending approximately orthogonally away from the opening and surrounding the opening in annular manner. The frame may have a cross-section corresponding to the filter element head of the filter element, so that the filter element head can be slidably inserted into this frame.

In particular when the at least one filter element or a plurality of filter elements are installed from the clean fluid side, the clean fluid collecting channel may have at least one mounting opening associated with the filter element receptacle, through which the filter element can be inserted into the filter element receptacle and/or removed from the filter element receptacle. This allows the filter element to be inserted into the clean fluid collecting channel or replaced in a short time.

The mounting opening may be located in a wall of the clean fluid collecting channel opposite the filter element receptacle. The mounting opening may be closable by a flap, a door, a removable cover or a slide.

The filter device may comprise a housing surrounding at least the clean fluid collecting channel and the filter elements arranged there, and the mounting opening may be arranged in the housing of the filter device. In particular, the housing delimits a raw fluid space. In particular, a housing wall or part of a housing wall may form one of the boundaries of the clean fluid collecting channel.

The clean fluid collecting channel may comprise aluminum, in particular may be made of aluminum as a main constituent. As an alternative, the clean fluid collecting channel may be made entirely or partially of sheet steel, in some applications of a stainless steel (VA) such as V2A or V4A. It is also conceivable to make the clean fluid collecting channel entirely or partially of plastic, such as PVC. Frequently, the clean fluid collecting channel will be made of the same material as a filter housing.

In an inventive method of cleaning-off the filter element of the filter device according to the invention, a pressure pulse is introduced counter to a direction of flow of the clean fluid flowing away from the filter element through a clean fluid outlet arranged on the clean fluid side and extending in a first plane, in such a manner that the pressure pulse undergoes a deflection by at least 60°, in particular a deflection by at least approximately 90°, when passing through the clean fluid outlet.

The advantages and embodiments of the filter device according to the invention are also applicable for the method and will not be repeated again for the sake of clarity.

The filter device according to the invention is used in particular in a device for extracting exhaust gases which are produced during additive manufacture of workpieces from powdery metallic starting materials, in a device for removing fumes which are produced during the manufacture of workpieces by means of laser-sintering processes, in a device for removing air impurities in a laser welding system or other welding fume extraction system, or in a device for removing impurities in fumes, in particular in fumes produced during additive manufacture or in combustion processes, or in systems for cleaning off paint residues during painting with wet paint or powder coating. Applications of the filter device according to the invention for the filtration of dusts and other particulate contaminants in the food industry are also conceivable.

BRIEF DESCRIPTION OF THE DRAWINGS

The invention will be described in more detail below with reference to exemplary embodiments illustrated schematically in the accompanying figures, wherein.

In all figures like reference numerals denote identical components or similar components as regards the function thereof. Each of these components will be explained in detail only with reference to the embodiment in which the corresponding reference numeral is used for the first time. It is understood that corresponding explanations are also applicable to the other embodiments in which the respective reference numeral is used. For avoiding repetitions, express reference is made to the corresponding description with the first use of the respective reference numeral, un-less expressly stated otherwise.

DETAILED DESCRIPTION

Figure 1:
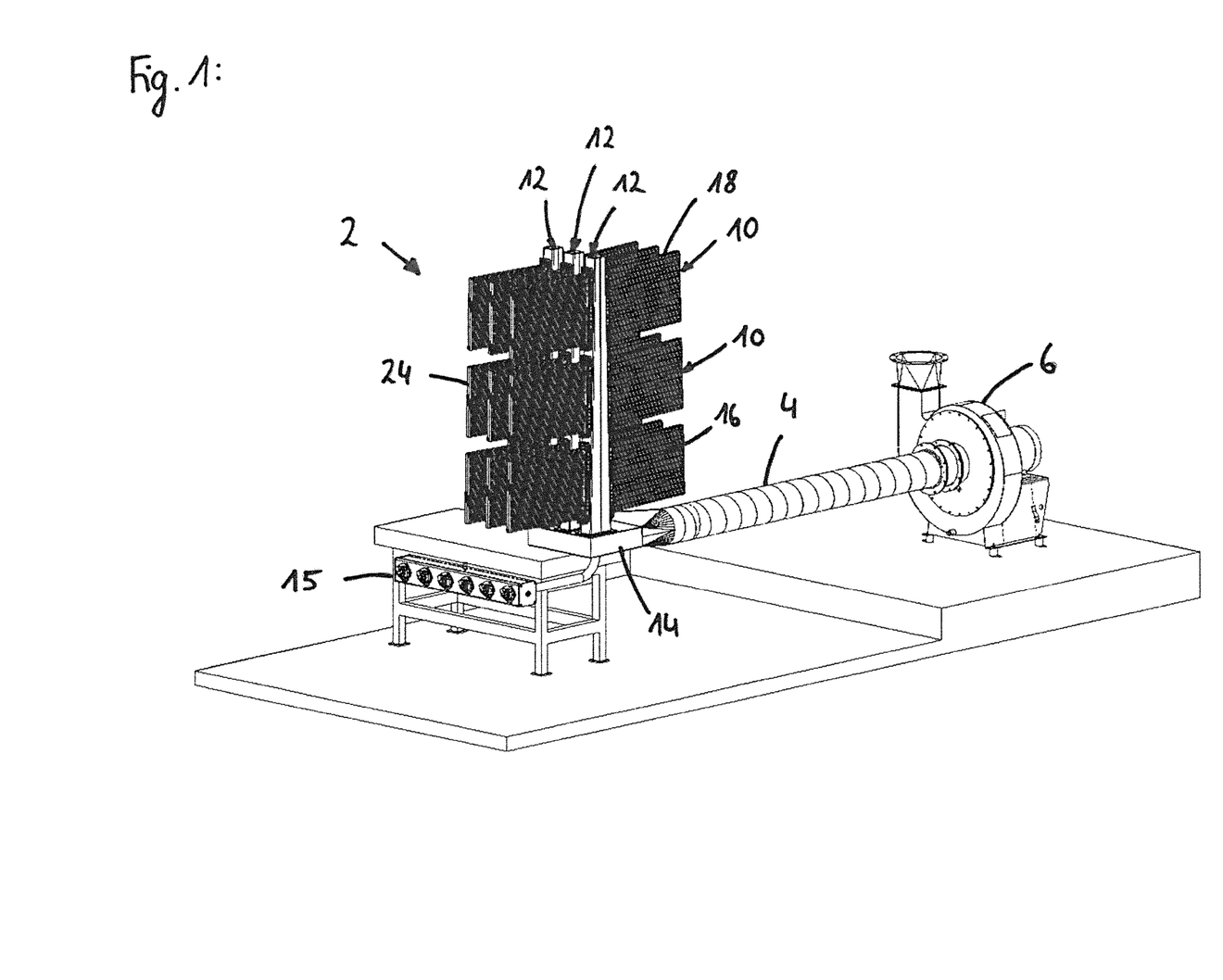
FIG. 1 shows a filter device according to the invention together with a blower connected downstream in the direction of flow in a three-dimensional view, in which a housing of the filter device is omitted.

FIG. 1 shows in a partial view components of an exemplary embodiment of a filter device 2 according to the invention for filtering fluid loaded with foreign matter, in this case air, which is arranged inside a filter housing not shown. The filter device 1 is connected to a suction pipe 4 of a blower 6 serving to discharge exhaust air. The blower 6 generates a negative pressure in the suction pipe 4, so that a raw fluid loaded with particulate foreign matter, which is located in a raw fluid space of the filter device 2, is drawn through filter elements 10 of the filter device 2. The filter device 2 thereby filters the particulate foreign matter from the raw fluid to obtain a clean fluid which leaves the filter device 2 via the suction pipe 4.

Figure 2:
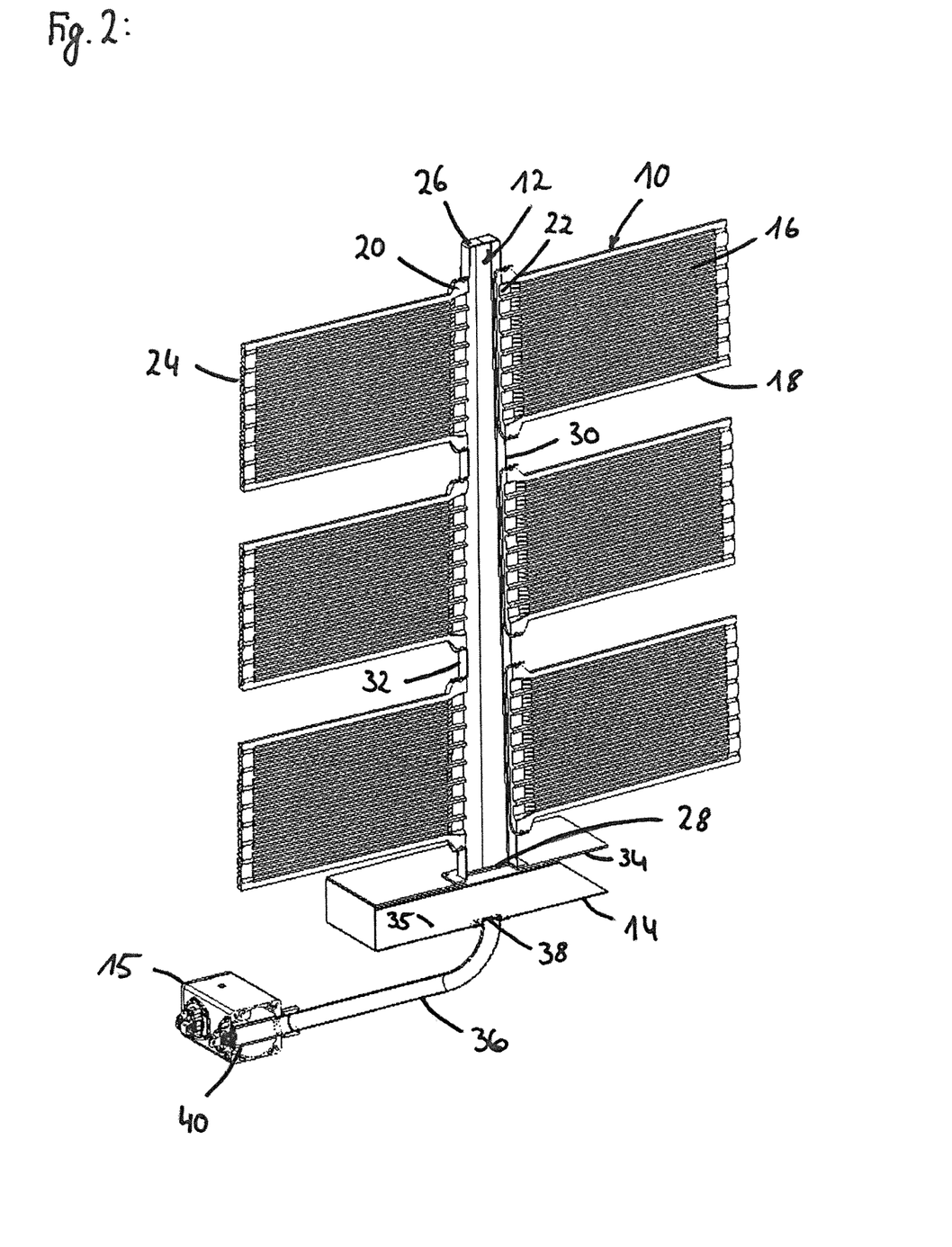
FIG. 2 shows a sectional view of a part of the filter device shown in FIG. 1 with several filter elements which open into a common clean fluid collecting channel.
Figure 3:
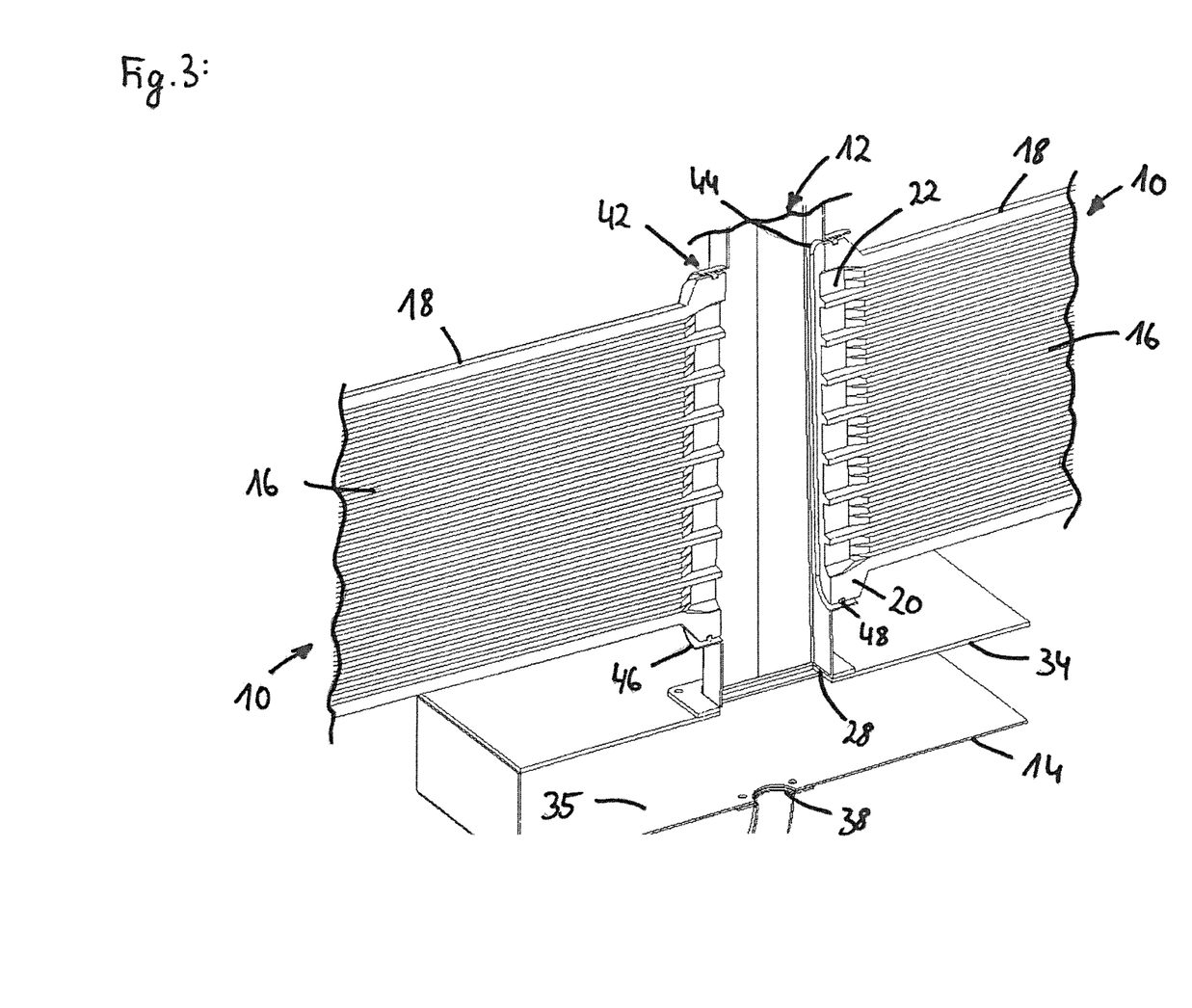
FIG. 3 shows an enlarged sectional view of a portion of the filter device shown in FIG. 2.

FIG. 2 shows a sectional view of part of the filter device 2 shown in FIG. 1 with several filter elements 10 which open into a common clean fluid collecting channel 12. The filter elements 10 of the part of the filter device 2 shown in FIG. 2 lie in a common plane which also contains the clean fluid collecting channel 12 into which all filter elements 10 open. As shown in FIG. 2, all filter elements 10 and the clean fluid collecting channel 12 are located in a vertical plane and the clean fluid collecting channel 12 also extends in vertical direction. The filter elements 10 each have a box-like shape with two wide sidewalls 16 connected by two narrow sidewalls 18. The sectional plane is a vertical plane through the center of the narrow sides of the filter elements 10. The filter elements 10 are arranged vertically one above the other in the direction of their wide sides, on both sides of the clean fluid collecting channel 12. A filter element head 20 is located at one end face of a respective filter element 10. At this location a clean fluid outlet 22 is formed. A foot end wall 24 is formed at the longitudinally opposite foot end of the filter element 10. The filter elements 10 each open into the clean fluid collecting channel 12 via their clean fluid outlet 22, the clean fluid outlets 22 of each of two filter elements 10 arranged at the same height being located opposite one another across the clean fluid collecting channel 26. FIG. 3 shows an enlarged sectional view of a partial region of the filter device of FIG. 2.

In the exemplary embodiment, the filter device 2 comprises a plurality of filter elements 10 configured to filter the raw fluid. The filter elements 10 each open into the clean fluid collecting channel 12, in which the clean fluid flowing away from the filter elements 10 is conducted toward the clean fluid collecting channel 12 (vertically downward in FIG. 2) until it flows through a clean fluid collecting channel outlet 28 into a clean fluid plenum 14. After the clean fluid has collected in the clean fluid plenum 14, it flows out of the filter device 2 through the suction pipe 4 as a result of the blower 6 (see FIG. 1).

The filter device 2 has a compressed-air cleaning-off device 15 which generates pressure pulses for cleaning-off filter surfaces of the filter elements 10 and conducts the same via the clean fluid collecting channel 12 to the clean fluid outlets 22 of the filter elements 10. The pressure pulses are then coupled through the clean fluid outlets 22 into the respective associated filter element 10 in order to act on the filter element 10 by means of the pressure pulses for cleaning-off. In the exemplary embodiment illustrated, the compressed-air cleaning-off device 15 is configured to apply pressure pulses to the clean fluid plenum 14 immediately after these pressure pulses have been generated. The pressure pulses then travel via the clean fluid plenum 14 into the clean fluid collecting channel 12 and to the clean fluid outlets 22 of the individual filter elements 10. The compressed-air cleaning-off device 15 operates according to the counterpressure principle. Here, a pressure surge or pressure pulse is generated by compressed air, which is introduced into the filter device 2 against or counter to the direction of flow of the clean fluid. The pressure pulse propagates through the clean fluid plenum 14, the clean fluid collecting channel 12 to the filter element 10 and is transferred to the filter element 10 through the clean fluid outlet opening. This ensures that foreign matter adhering to the filter element 10 is blasted off the filter element 10 and falls down on the raw fluid side of the filter element 10. In this way, the cleaning-off, which takes place recurrently during operation of the filter device, ensures that the filter element 10 is cleaned from time to time and thus provides for better filtering performance.

The filter element 10 is designed as a rigid-body filter, which has a throughflow-porous filter body made of a sintered material. The filter element 10 has a box-like shape, with two wide sidewalls 16 and two narrow sidewalls 18, although often only one of the corresponding sidewalls is shown in the figures. The filter element 10 forms a clean fluid space in its interior. In FIG. 3, two filter elements 10 are shown in sectional view with their respective filter element heads 20 arranged at the clean fluid collecting channel 12 such that their respective clean fluid outlets 22 formed in the filter element head 20 open into the clean fluid collecting channel 12 and allow the clean fluid to flow out of the respective filter element 10. The clean fluid outlet 22 may be subdivided into a plurality of partial clean fluid outlets, for example by suitably designing the filter element head 20 with a plurality of webs interconnecting the two wide sidewalls 16. At an end of the filter element 10 opposite the clean fluid outlet 22, the filter element 10 includes a foot end wall 24 terminating the filter element 10 on that side. The filter element head 20 and the foot end wall 24 are connected to each other by sidewalls 16 and 18. The wide sidewalls 16, and typically also the narrow sidewalls 18, are formed to be throughflow-porous, i.e. porous to permit flow therethrough, and provide filtration surfaces for filtering the raw fluid. The foot end wall 24 may also be formed to be throughflow-porous in order to maximize the filtration area. Alternatively, the foot end wall may also be formed to be impermeable to fluid. Furthermore, it is possible as an alternative to orient the wide sidewalls 16 with respect to each other such that they are inclined toward each other from the filter element head 20 toward the opposite end of the filter element 10 and abut each other at the opposite end so that the foot end wall 24 is unnecessary in this alternative.

In the exemplary embodiment shown, the wide sidewalls 16 have a lamellar configuration and are formed in zig-zag-like or wave-like manner to increase the filtration area thus formed. In this regard, the peaks and valleys formed thereby basically have a course extending in the longitudinal direction of the filter element 10. The peaks and valleys flatten out in the direction of the filter element head 20, in particular in the filter element head 20, so that the clean fluid outlet 22 has a substantially rectangular cross-section. This lamellar configuration is optional, so that other configurations of the filter element are conceivable as well.

In the exemplary embodiment shown in FIG. 1, the filter device 2 comprises three clean fluid collecting channels 12 arranged in parallel side by side, each thereof extending in vertical direction. Six filter elements 10 are attached to each clean fluid collecting channel 12. It is understood that the filter device 2 may comprise any number of clean fluid collecting channels 12 and filter elements 10. The clean fluid collecting channels 12 may be arranged in any other orientation with respect to each other. Each of the clean fluid collecting channels 12 extends basically in a longitudinal direction. In FIG. 1, the longitudinal direction is the vertical direction; however, the longitudinal direction may be any other direction. The clean fluid outlet 22 of the filter element 10 is oriented approximately parallel to the longitudinal direction of the clean fluid collecting channel 12, such that the clean fluid flows from the clean fluid outlet 22 into the clean fluid collecting channel 12 approximately orthogonal to the longitudinal direction of the clean fluid collecting channel 12. The clean fluid is then deflected and flows through the clean fluid collecting channel 12 in the longitudinal direction of the clean fluid collecting channel 12.

The clean fluid collecting channel 12 opens with the clean fluid collecting channel outlet 28 into the clean fluid plenum 14. At the first end 26 of the clean fluid collecting channel 12 located opposite the clean fluid collecting channel outlet 28, the clean fluid collecting channel 12 is closed, preferably by an end wall or by another closure. The clean fluid collecting channel 12 is formed as a hollow body extending from the first end 26 to the clean fluid collecting channel outlet 28. In the exemplary embodiment, the clean fluid collecting channel 12 has a square cavity cross-section that steadily increases in size from the end 26 to the clean fluid collecting channel outlet 28. It is also conceivable that the clean fluid collecting channel 12 has an oval or round cavity cross-section. The clean fluid collecting channel outlet 28 forms a second end of the clean fluid collecting channel 12.

Filter elements 10 each arranged on the same side of the clean fluid collecting channel 12 are arranged in series along the clean fluid collecting channel 12 in the direction of flow of the clean fluid. In the exemplary embodiment, three filter elements 10 are arranged in a first sidewall 30 of the clean fluid collecting channel 12 and three filter elements 10 are arranged in a second sidewall 32 of the clean fluid collecting channel 12 opposite the first sidewall 30. The sidewalls 30 and 32 extend in the longitudinal direction of the clean fluid collecting channel 12. The filter element is arranged on the clean fluid collecting channel 12 such that the two wide sidewalls 16 of the filter element 10 are oriented parallel to the longitudinal direction of the clean fluid collecting channel 12.

The clean fluid collecting channel 12 opens with its clean fluid collecting channel outlet 28 at a first side 34 of the clean fluid plenum 14. At a second side of the clean fluid plenum 14 opposite the first side 34, a compressed-air supply channel 36 having a compressed-air supply channel outlet 38 is arranged such that the com-pressed-air supply channel outlet 38 is located opposite the clean fluid collecting channel outlet 28 and a pressure pulse emanating from the compressed-air supply channel outlet 38 travels to the clean fluid channel outlet 28. The compressed-air supply channel 36 having the compressed-air supply channel outlet 38 is oriented to introduce compressed air into the clean fluid collecting channel 12 along the longitudinal direction of the clean fluid collecting channel 12. The compressed-air supply channel 36 is arranged with its compressed-air supply channel outlet 38 at a location downstream of the last filter element 10 with respect to the direction of flow of the clean fluid flowing away from the filter element 10 downstream of the clean fluid outlet 22. The compressed-air supply channel 36 is connected to a compressed-air generator or a compressed-air accumulator, which is not shown, via a control element 40, preferably a controllable valve that can be opened and closed. In the exemplary embodiment, a corresponding compressed-air supply channel 36 is associated with each clean fluid collecting channel 12.

As an alternative, the compressed-air supply channel 36 may also be associated with a plurality of clean fluid collecting channels 12. For example, in an exemplary embodiment not shown, the compressed-air supply channel 36 may branch at its end and terminate in two compressed-air supply channel outlets 38, each com-pressed-air supply channel outlet 38 opening into the clean fluid plenum 14 opposite a clean fluid collecting channel outlet 28. It is also conceivable, in an exemplary embodiment not shown, that no clean fluid plenum 14 is arranged between the compressed-air supply channel outlet 38 and the clean fluid collecting channel outlet 28.

When cleaning-off of the filter elements 10 is to be carried out, the control element 40 is actuated manually or automatically. Thereafter, a compressed air flow is introduced through the compressed-air supply channel 36 and through the com-pressed-air supply channel outlet 38 into the clean fluid plenum 14, where it generates a pressure pulse or pressure surge. From there, the pressure pulse propagates through the clean fluid collecting channel outlet 28 into the clean fluid collecting channel 12. At the clean fluid outlet 22 of the filter element 10, the pressure pulse is deflected by at least 60°, in particular by at least approximately 80°, in particular by at least approximately 90°, and then reaches the clean fluid space of the filter element 10. The pressure pulse is transferred to walls 16, 18 of the filter element 10, whereby foreign matter adhering to the raw fluid side of the walls 16, 18 is blasted off the filter element 10 and cleaning-off of the filter element 10 takes place.

The clean fluid plenum 14 forms a space spacing the clean fluid collecting channel outlet 28 from the compressed-air supply channel outlet 38. This has the advantage that the clean fluid contained within the clean fluid plenum 14 can be used to amplify the pressure pulse emanating from the compressed-air supply channel outlet 38. The amplification is accomplished by the pressure pulse causing the fluid located in the clean fluid plenum 14 to oscillate. As the distance between the com-pressed-air supply channel outlet 38 and the clean fluid channel outlet 28 increases, the cross-section of the pressure pulse increases and thus also the amount of fluid excited by the pressure pulse in the clean fluid plenum. Thus, when the oscillations of the fluid in the clean fluid plenum 14 excited by the pressure pulse are coupled into the clean fluid channel outlet 28, the pressure pulse can act on an additional or larger amount of clean fluid in the clean fluid collecting channel 12. This amplification allows the pressure pulse to effect good cleaning-off of the respective filter element 10 after it reaches and passes through the respective clean fluid outlet 22.

In the exemplary embodiment, the clean fluid collecting channel 12 has a plurality of filter element receptacles 42 for receiving the filter elements 10. A respective filter element receptacle 42 has an opening 44 through which the clean fluid passes from the filter element 10 through the clean fluid outlet 22 into the clean fluid collecting channel 12. An annular collar 46 or edge is disposed around the opening 44 and extends away from the clean fluid collecting channel 12 in an approximately orthogonal direction. In an embodiment not shown, the collar may also extend approximately orthogonally into the clean fluid collecting channel 12. The collar 46 forms a receiving space into which the filter element head 20 of the filter element 10 can be slidably inserted. The receiving space is laterally bounded by an inner surface of the collar 46, the inner surface being adapted to sealingly cooperate with an outer surface of the filter element head 20 so that no raw fluid or clean fluid can escape therethrough. In the exemplary embodiment, the outer surface of the filter element head 20 has a sealing element 48, whereby a further improved sealing effect between the inner surface and the outer surface is possible. The clean fluid collecting channel 12 is configured such that the filter elements 10 are installed from the raw fluid side and are attached to the clean fluid collecting channel 12.

Figure 4:
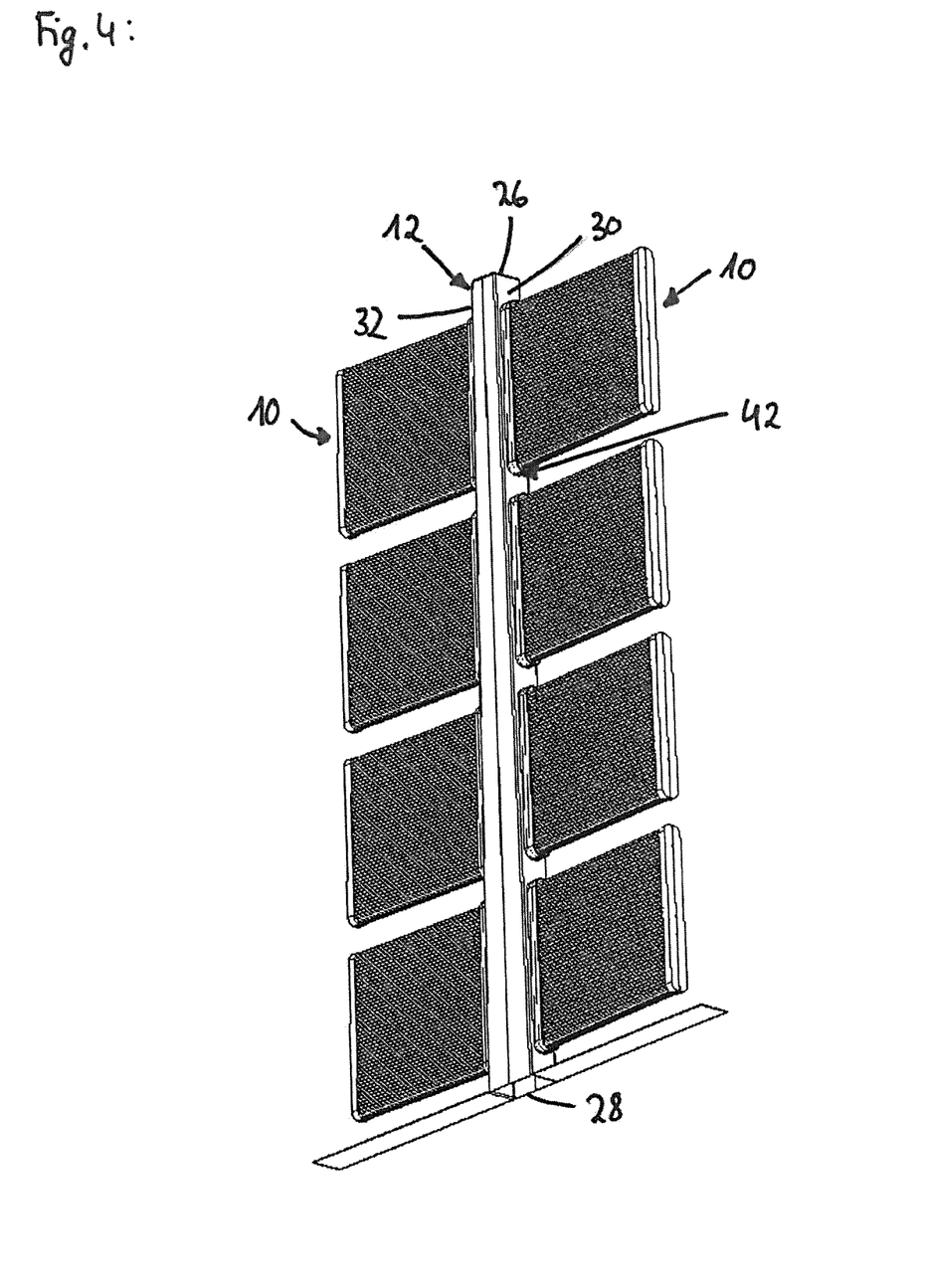
FIG. 4 shows a three-dimensional view of a part of a another filter device according to the invention with eight filter elements which open into a common clean fluid collecting channel.
Figure 5:
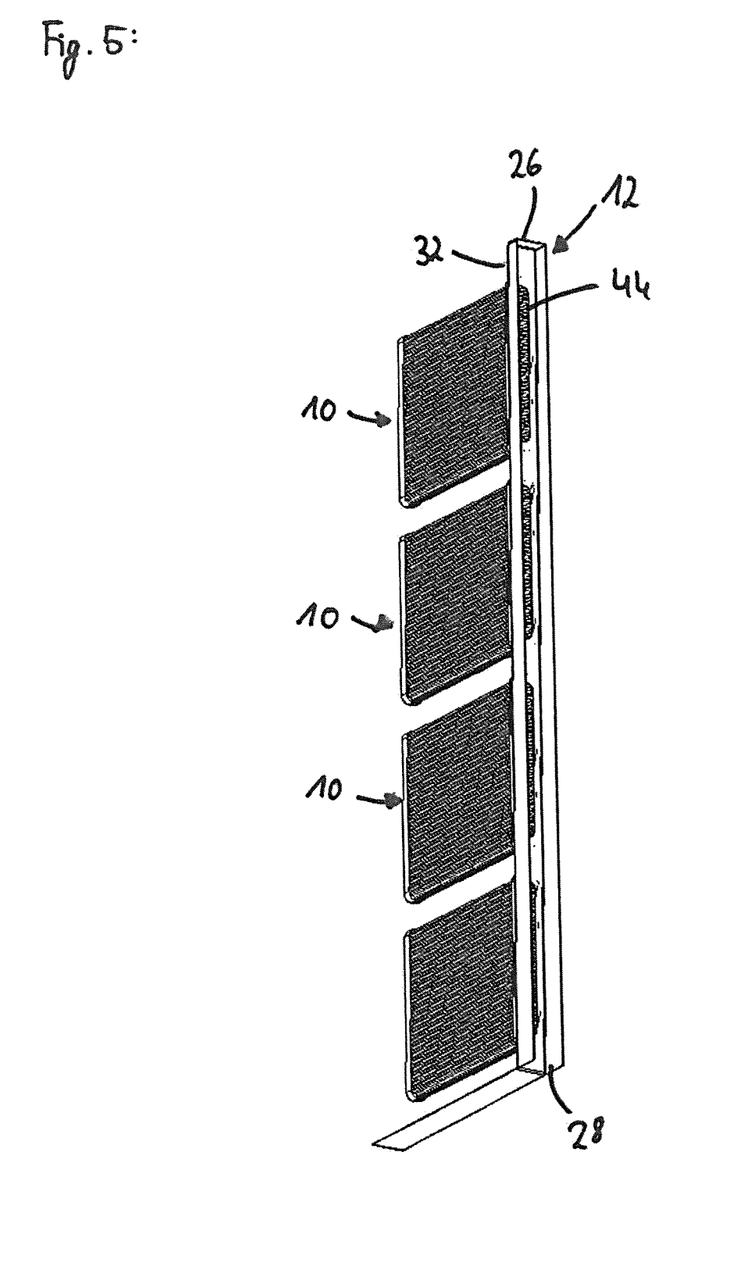
FIG. 5 shows a partial view of only the filter elements arranged on the left of the clean fluid collecting channel in FIG. 4, along with a cut-away view of the clean fluid collecting channel.

FIGS. 4 and 5 show the clean fluid collecting channel 12 with eight filter elements 10, four of which are arranged in longitudinal direction on the first sidewall of the clean fluid collecting channel 12 one after the other in the direction of flow of the clean fluid, and additional four of which filter elements 10 are arranged in longitudinal direction on the second sidewall 32 of the clean fluid collecting channel 12 one after the other in the direction of flow of the clean fluid. The clean fluid collecting channel 12 is configured such that the filter elements 10 are installed from the raw fluid side and are attached to the clean fluid collecting channel 12.

Figure 6:
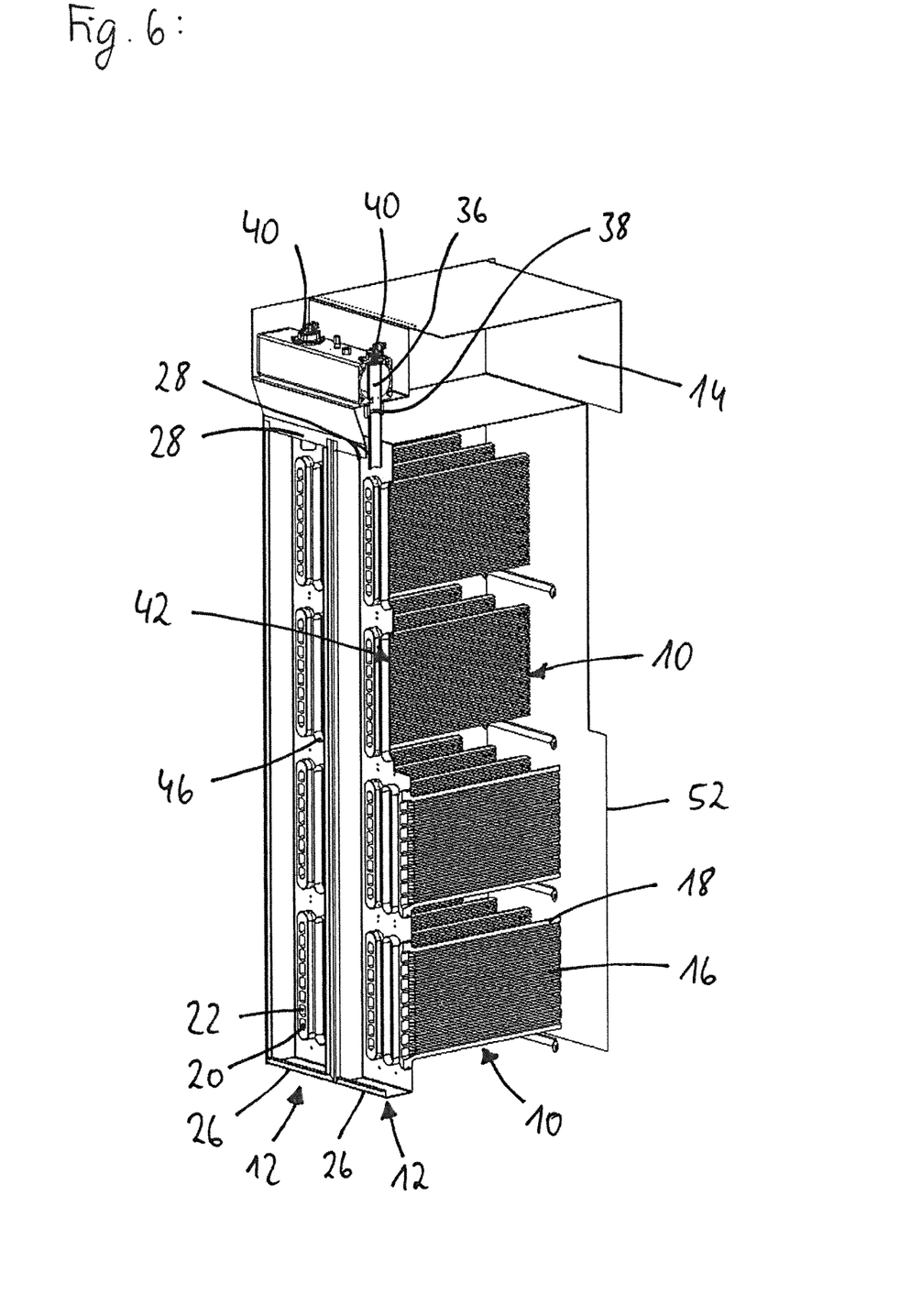
FIG. 6 shows a further partial view of a filter device according to the invention with several clean fluid collecting channels.

FIG. 6 shows an embodiment with two clean fluid collecting channels 12 extending in vertical direction and arranged parallel to each other. The illustration in FIG. 6 corresponds essentially to that of FIG. 5. In FIG. 6, only the part of the filter elements 10 located to the right of the center of the clean fluid collecting channels 12 is shown, it being understood that in reality filter elements 10 open into the clean fluid collecting channel 12 in mirror image from the left side and from the right side. As explained hereinbefore, also in FIG. 6 the same reference numerals each refer to the same or similar components or features as in the preceding embodiments. In the following, only differences or special features of the embodiment shown in FIG. 6 as compared to the other embodiments will be described; with respect to the remaining description, reference is made to the preceding embodiments.

As in the preceding embodiments, a plurality of filter elements 10 are arranged one after the other at each clean fluid collecting channel 12 in the longitudinal direction of the clean fluid collecting channel 12, in such a way that the filter elements each follow one another in their width direction. In addition, in FIG. 6, three or more filter elements 10 arranged side by side in the direction of their narrow sides each open into the same clean fluid collecting channel 12. Thus, in the embodiment illustrated with four pairs of filter elements 10 arranged one above the other, 12 filter elements open into each clean fluid collecting channel 12. The clean fluid outlet 22 of each filter element 10 opens into the corresponding clean fluid collecting channel 12. In FIG. 6, therefore, twelve clean fluid outlets 22 each open into a respective clean fluid collecting channel 12. Each clean fluid collecting channel 12 has a first, closed end 26 (bottom in FIG. 6) and an opposite second end forming a clean fluid collecting channel outlet 28 (top in FIG. 6). The clean fluid collecting channel outlets 28, 28 open into a common clean fluid plenum 14. Opposite each of the clean fluid collecting channel outlets 28, there is disposed a respective compressed-air supply channel 36 with associated compressed-air channel outlet 38 (for clarity, in FIG. 6 only the right-hand clean fluid collecting channel 12 is provided with reference numerals). Via the respective compressed-air channel outlet 38, a pressure pulse can be coupled into the respective clean fluid collecting channel 12 via the associated clean fluid collecting channel outlet 28 against the direction of flow of the clean fluid, as already described hereinbefore. For this purpose, each of the compressed air supply channels 36 has a control device 40 by means of which the compressed-air supply channel 36 can be opened or closed. The control device 40 is preferably a controllable valve or a controllable flap.

Figure 7:
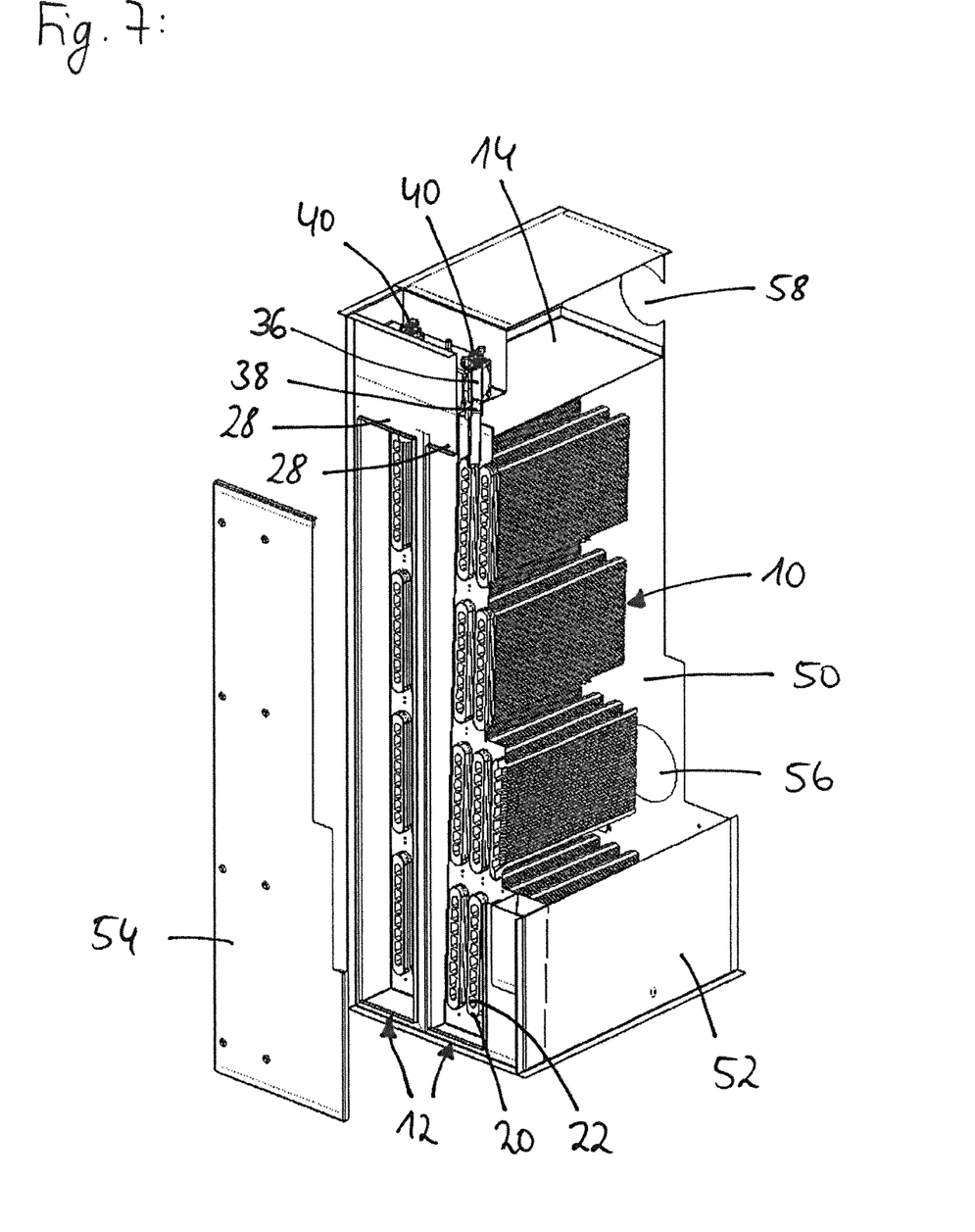
FIG. 7 shows a three-dimensional view of a part of a further filter device according to the invention with twelve filter elements installed on the clean fluid side, which open into a common clean fluid collecting channel.
Figure 8:
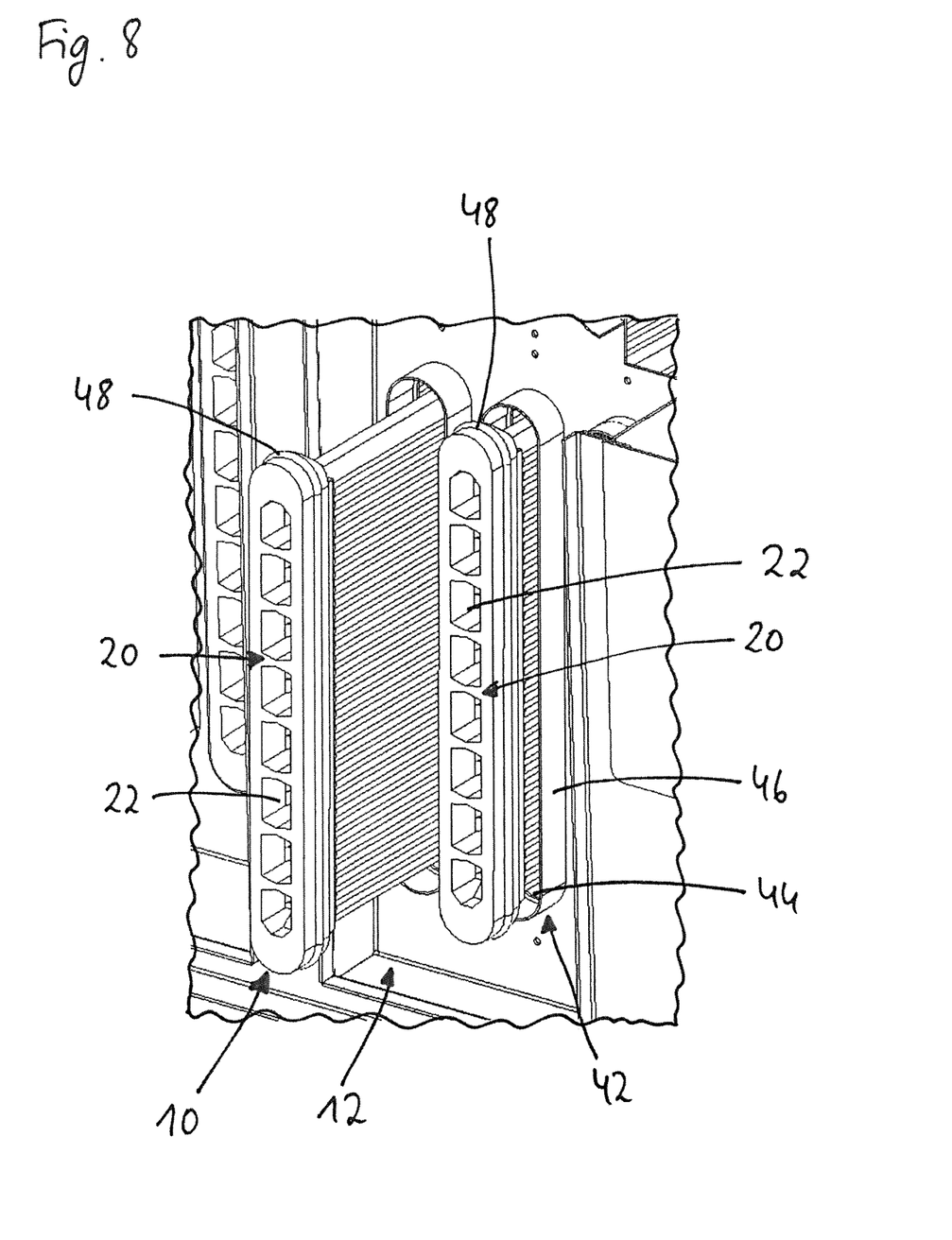
FIG. 8 shows a partial view of only the filter elements arranged at the in FIG. 7 lower end of the clean fluid collecting channel.

FIG. 7 shows a three-dimensional view of a part of a further embodiment of a filter device according to the invention with twelve filter elements 10 installed on the clean fluid side, which open into a common clean fluid collecting channel 12. FIG. 8 shows a partial view of the filter elements 10 arranged at the lower end of the clean fluid collecting channel 12 in FIG. 7.

FIG. 7 shows two clean fluid collecting channels 12, into each of which twelve filter elements 10 are slidably inserted into the corresponding filter element receptacle 42 on the clean fluid side, i.e. from the side of the clean fluid flowing in the clean fluid collecting channel 12. Each filter element receptacle 42 has an opening 44 formed in the associated wall of the clean fluid collecting channel 12, through which the respective filter element 10 can be slidably inserted into the raw fluid space 50 of a filter housing 52 surrounding the filter elements 10. An annular collar 46 or edge is arranged around each opening 44, which projects approximately orthogonally into the clean fluid collecting channel 12 from the wall of the clean fluid collecting channel 12. The collar 46 forms the receiving space into which the filter element head of the filter element 10 can be slidably inserted. The receiving space is laterally bounded by the inner surface of the collar 46, and the inner surface of the collar can sealingly cooperate with the associated outer surface of the filter element head 20 so that no raw fluid or clean fluid can escape therethrough. For improving the sealing effect, the outer surface of the filter element head 20 in the embodiment comprises a sealing element 48, for example a sealing ring. The clean fluid collecting channel 12 is configured such that the filter elements 10 are installed and inserted into the clean fluid collecting channel 12 from the clean fluid side. The clean fluid collecting channel 12 is arranged adjacent to the filter housing 52, such that a sidewall of the clean fluid collecting channel 12 arranged opposite to the filter element receptacles 42 is formed by a housing wall 54. As shown in FIG. 7, the housing wall 54 is formed of a sheet-metal member in the region opposite the 12 filter element receptacles 42 and thus forms a door which can be opened or removed in one piece in order to insert the filter elements 10 into the respective associated opening 44 of the filter element receptacle 42 and to fasten the filter element 10 with its filter element head 20 to the clean fluid collecting channel 12. Alternatively or additionally, the housing wall 54 may include a mounting opening, not shown, for slidably inserting the filter element 10 through the mounting opening into the opening 44 of the filter element receptacle 42 and securing the filter element 10 with its filter element head 20 to the clean fluid collecting channel 12. The housing wall 54 may preferably be arranged such that the mounting opening formed therein is located opposite the filter element receptacle 42. The mounting opening can be closed with a slide, a flap, or a cover so that no clean fluid can escape from the clean fluid collecting channel 12 during operation.

In FIG. 8, a lower end of the clean fluid collecting channel 12 of FIG. 7 is shown in detail. In FIG. 8, two filter elements 10 are only partially inserted into the opening 44 of the filter element receptacle 42 to illustrate the installation or removal of the filter elements 10 on the clean fluid side. In an insertion position, the filter element head 20 is then received in the receiving space of the filter element receptacle 42 and sealingly abuts against the respective collar 46.

Figure 9:
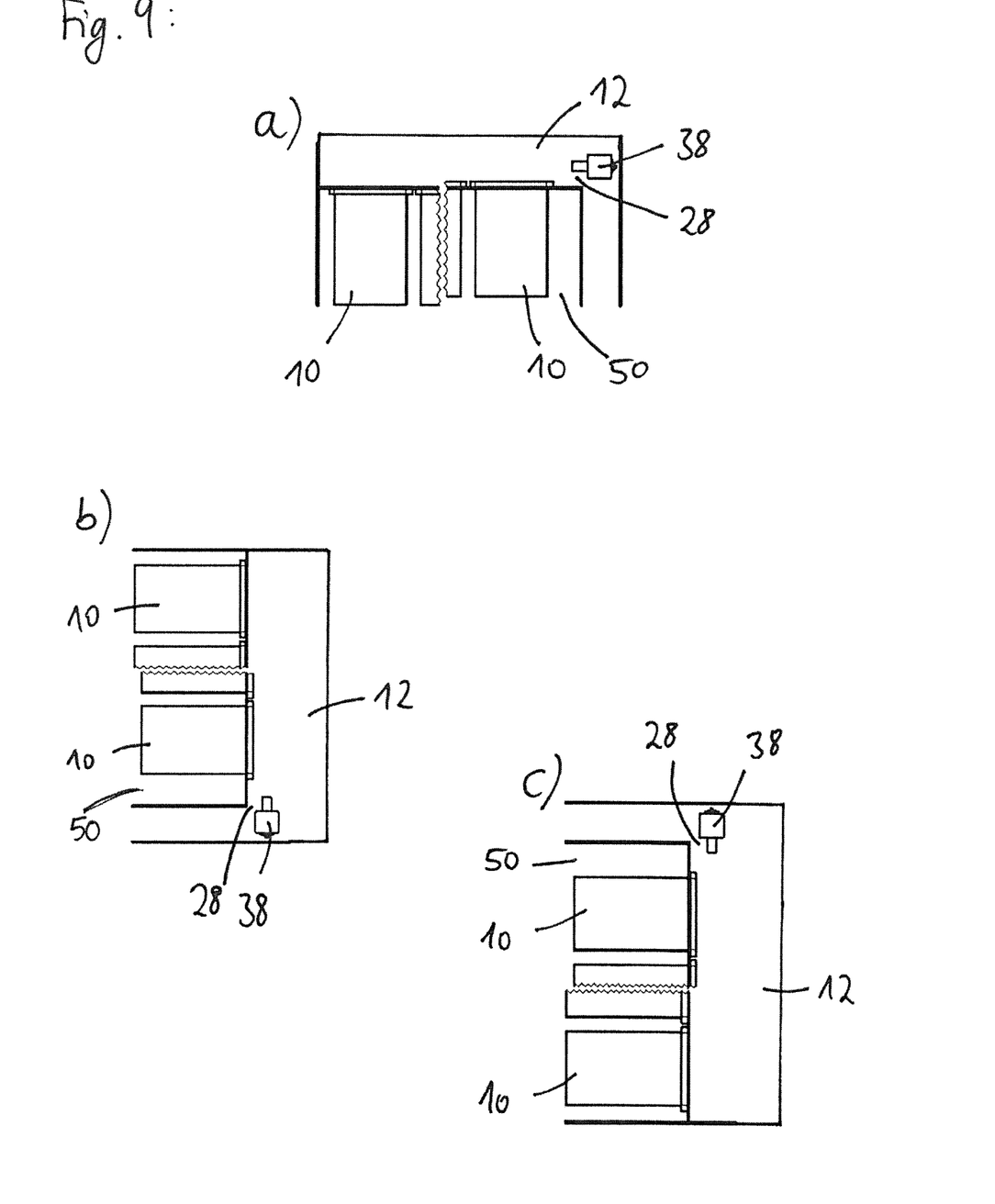
FIG. 9 shows, in partial FIGS. 9a), 9b) and 9c) thereof, different spatial orientations of filter elements in a filter device according to the invention, schematically illustrating in addition how the filter elements can be installed on the raw fluid side or the clean fluid side.

FIG. 9 shows, in partial FIGS. 9a), 9b) and 9c) thereof, different spatial orientations of the filter device 2 according to the invention and, in addition, schematically an installation of the filter elements 10 on the raw fluid side and on the clean fluid side in the clean fluid collecting channel 12 with different spatial orientations. In the partial figures, the filter body of the filter elements 10 projects into the raw fluid space 50.

FIG. 9a) shows the clean fluid collecting channel 12 in a horizontal orientation. The filter elements 10 are arranged suspended in the clean fluid collecting channel 12, the left filter element 10 being inserted into the clean fluid collecting channel 12 on the raw fluid side and the right filter element 10 being inserted into the clean fluid collecting channel 12 on the clean fluid side. The compressed-air supply channel outlet 38 is located to the right of the clean fluid collecting channel 12 near the clean fluid collecting channel outlet 28, where the clean fluid exits the clean fluid collecting channel 12 during normal operation.

FIG. 9b) shows the clean fluid collecting channel 12 in a vertical orientation. The filter elements 10 are arranged orthogonally to the vertical orientation of the clean fluid collecting channel 12, such that the longitudinal direction of the filter elements extends horizontally. The upper filter element 10 is inserted into the clean fluid collecting channel 12 on the raw fluid side, and the lower filter element 10 is inserted into the clean fluid collecting channel 12 on the clean fluid side. The compressed-air supply channel outlet 38 is arranged at the bottom opposite the clean fluid collecting channel outlet 28 of the clean fluid collecting channel 12.

FIG. 9c) shows the clean fluid collecting channel 12 in a vertical orientation. The filter elements 10 are arranged orthogonally to the vertical orientation of the clean fluid collecting channel 12. The lower filter element 10 is inserted into the clean fluid collecting channel 12 on the raw fluid side, and the upper filter element 10 is inserted into the clean fluid collecting channel 12 on the clean fluid side. The compressed-air supply channel outlet 38 is disposed at the top opposite the clean fluid collecting channel outlet 28 of the clean fluid collecting channel 12.

The filter device 2 further comprises a filter housing 52 enclosing the filter elements 10 and the clean fluid collecting channel or channels 12. The filter housing 52 has a raw fluid inlet 56 for supplying raw fluid into the raw fluid space 50 and to the filter elements 10. The raw fluid thus supplied is then filtered through the filter elements 10 and discharged as clean fluid from the filter device 2, through a clean fluid outlet 58 in the filter housing 52.

In FIGS. 1 to 5, the clean fluid collecting channels 12 are arranged such that the clean fluid collecting channel outlets 28 are directed downwards in the figures. This is an exemplary installation situation and is not to be regarded as a limitation for use of the filter device 2 according to the invention. Just as well, the clean fluid collecting channel outlet 28 can be directed upwards, as shown in FIG. 6 to 8, or be directed to the side.

The above-described embodiments are to be understood merely as examples. In particular, in further embodiments, a different number of filter elements, a different number of clean fluid collecting channels, a different arrangement of the filter elements on the clean fluid collecting channel(s), a different number of clean fluid plenums, and/or a different number of compressed-air supply channels may be used for the filter device according to the invention.

The invention claimed is:

1. A filter device comprising:
   at least one filter element adapted to filter a raw fluid and having a raw fluid side and a clean fluid side, said at least one filter element having a clean fluid outlet arranged on said clean fluid side and extending in a first plane, through which clean fluid is conducted out of said at least one filter element;
   at least one clean fluid collecting channel into which the clean fluid outlet opens; and
   at least one compressed-air cleaning-off device adapted to generate a pressure pulse for cleaning-off foreign matter adhering to the at least one filter element and to conduct the same through the clean fluid outlet to the at least one filter element,
   wherein the compressed-air cleaning-off device is adapted to conduct the pressure pulse at least approximately along the first plane to the clean fluid outlet,
   wherein the compressed-air cleaning-off device comprises a compressed-air supply channel operationally coupled to a clean fluid collecting channel outlet and adapted to charge the clean fluid collecting channel with pressure pulses, wherein an outlet end for pressure pulses of the compressed-air supply channel is located opposite the clean fluid collecting channel outlet of the clean fluid collecting channel across a space, wherein the size of the space between the outlet end of the compressed-air supply channel and the clean fluid collecting channel outlet is selected so large that the pressure pulse increases its pressure pulse area in the course of its travel between the outlet end of the compressed-air supply channel and the clean fluid collecting channel outlet.

2. The filter device according to claim 1,
   wherein the at least one filter element forms a filter pocket or cartridge formed by filter surfaces, with an open side forming the clean fluid outlet.

3. The filter device according to claim 1,
   wherein the at least one filter element is formed as a rigid-body filter,
   wherein the at least one filter element comprises a throughflow-porous filter body made of a sintered material, wherein the sintered material comprises in particular a sintered plastic as main constituent, sintered polyethylene particles or sintered polyphenylene sulfide particles as main constituent.

4. The filter device according to claim 1,
   wherein the at least one filter element has a box shape, with two wide sidewalls and two narrow sidewalls extending from the clean fluid outlet to an opposite end,
   wherein the opposite end is closed.

5. The filter device according to claim 4,
   wherein the at least one filter element is arranged such that the two wide sidewalls extend parallel to the direction of flow of the clean fluid downstream of the clean fluid outlet,
   wherein the wide sidewalls are oriented parallel to the direction of the pressure pulse traveling toward the clean fluid outlet.

6. The filter device according to claim 1,
   wherein the clean fluid collecting channel extends at least approximately parallel to the first plane.

7. The filter device according to claim 6,
   wherein the clean fluid collecting channel is a hollow body extending from a closed end to an open end,
   wherein particularly the clean fluid collecting channel has a square, substantially oval or substantially round cavity cross-section.

8. The filter device according to claim 1,
   wherein the clean fluid collecting channel has a cross-section that increases in the direction of flow of the clean fluid flowing away from the filter element downstream of the clean fluid outlet, and increases steadily from an upstream first end to a downstream second end.

9. The filter device according to claim 1,
   comprising two or more filter elements, wherein the filter elements are arranged following each other with respect to the direction of flow of the clean fluid flowing away from the filter element downstream of the clean fluid outlet,
   wherein the two or more filter elements are arranged one after the other along the clean fluid collecting channel.

10. The filter device according to claim 1,
    wherein the compressed-air supply channel is arranged at a location downstream of a last filter element with respect to the direction of flow of the clean fluid flowing away from the at least one filter element downstream of the clean fluid outlet.

11. The filter device according to claim 1,
    wherein the compressed-air cleaning-off device is adapted to introduce the pressure pulse into the clean fluid collecting channel against a direction of flow of the clean fluid with respect to the direction of flow of the clean fluid downstream of the clean fluid outlet.

12. The filter device according to claim 1,
    further comprising at least two clean fluid collecting channels, each having at least one filter element associated with the clean fluid collecting channel, wherein the at least two clean fluid collecting channels open into a common clean fluid plenum, wherein a corresponding compressed-air supply channel of the compressed-air cleaning-off device is associated with each of the at least two clean fluid collecting channels.

13. The filter device according to claim 12, wherein the respective compressed-air supply channel of the compressed-air cleaning-off device opens into the clean fluid plenum via a compressed-air supply channel outlet.

14. The filter device according to claim 13, wherein the compressed-air supply channel opens into the clean fluid plenum opposite the clean fluid collecting channel outlet of the associated clean fluid collecting channel.

15. The filter device according to claim 1, wherein the compressed-air supply channel has a control element configured to control a supply of compressed air into the corresponding clean fluid collecting channel.

16. The filter device according to claim 1, wherein the clean fluid collecting channel has at least one filter element receptacle into which the at least one filter element can be slidably inserted, wherein the filter element receptacle has an opening formed in the clean fluid collecting channel, which opening has a cross-section corresponding to a filter element head of the at least one filter element, so that the filter element head can be slidably inserted into said opening.

17. The filter device according to claim 16, wherein the at least one clean fluid collecting channel has a mounting opening associated with the filter element receptacle, through which the at least one filter element can be inserted into the filter element receptacle and/or can be removed from the filter element receptacle, wherein the mounting opening is arranged in a wall of the clean fluid collecting channel located opposite the filter element receptacle, wherein the mounting opening is closable with a flap, a door, a removable cover, or a slide, wherein the filter device comprises a housing and the mounting opening is arranged in the housing of the filter device.

18. The filter device according to claim 1, wherein the at least one filter element is formed integrally as a single unitary piece.

19. A method of cleaning-off the filter element of the filter device according to claim 1, comprising:
introducing at least one pressure pulse counter to a direction of flow of the clean fluid flowing away from the at least one filter element through a clean fluid outlet arranged on the clean fluid side and extending in a first plane, such that the pressure pulse undergoes at least one of a deflection by at least 60°, a deflection of at least approximately 80°, a deflection by at least approximately 90°, when passing through the clean fluid outlet, wherein the pressure pulse is introduced into at least one clean fluid collecting channel into which the clean fluid outlet opens, said pressure pulse being introduced by acting upon a clean fluid collecting channel outlet associated with the clean fluid collecting channel by use of a compressed-air supply channel.

20. A filter device comprising:
at least one filter element adapted to filter a raw fluid and having a raw fluid side and a clean fluid side, said at least one filter element having a clean fluid outlet arranged on said clean fluid side and extending in a first plane, through which clean fluid is conducted out of said at least one filter element;
at least one clean fluid collecting channel into which the clean fluid outlet opens; and
at least one compressed-air cleaning-off device adapted to generate a pressure pulse for cleaning-off foreign matter adhering to the at least one filter element and to conduct the same through the clean fluid outlet to the at least one filter element,
wherein the compressed-air cleaning-off device is adapted to conduct the pressure pulse at least approximately along the first plane to the clean fluid outlet,
wherein the compressed-air cleaning-off device comprises a compressed-air supply channel operationally coupled to a clean fluid collecting channel outlet and adapted to charge the clean fluid collecting channel with pressure pulses; and
two or more filter elements, wherein the filter elements are arranged following each other with respect to the direction of flow of the clean fluid flowing away from the filter element downstream of the clean fluid outlet, wherein the two or more filter elements are arranged one after the other along the clean fluid collecting channel.

21. A filter device comprising:
at least one filter element adapted to filter a raw fluid and having a raw fluid side and a clean fluid side, said at least one filter element having a clean fluid outlet arranged on said clean fluid side and extending in a first plane, through which clean fluid is conducted out of said at least one filter element;
at least one clean fluid collecting channel into which the clean fluid outlet opens; and
at least one compressed-air cleaning-off device adapted to generate a pressure pulse for cleaning-off foreign matter adhering to the at least one filter element and to conduct the same through the clean fluid outlet to the at least one filter element,
wherein the compressed-air cleaning-off device is adapted to conduct the pressure pulse at least approximately along the first plane to the clean fluid outlet,
wherein the compressed-air cleaning-off device comprises a compressed-air supply channel operationally coupled to a clean fluid collecting channel outlet and adapted to charge the clean fluid collecting channel with pressure pulses; and
at least two clean fluid collecting channels, each having at least one filter element associated with the clean fluid collecting channel, wherein the at least two clean fluid collecting channels open into a common clean fluid plenum, wherein a corresponding compressed-air supply channel of the compressed-air cleaning-off device is associated with each of the at least two clean fluid collecting channels.

\* \* \* \* \*